United States Patent [19]

McClure

[11] Patent Number: 4,875,127
[45] Date of Patent: Oct. 17, 1989

[54] APPARATUS AND METHOD FOR PRECISE TAPE GUIDING IN A MAGNETIC TAPE TRANSPORT

[75] Inventor: Richard J. McClure, San Diego, Calif.

[73] Assignee: Eastman Kodak Company, Rochester, N.Y.

[21] Appl. No.: 178,400

[22] Filed: Apr. 6, 1988

[51] Int. Cl.⁴ .............................................. G11B 15/60
[52] U.S. Cl. ................................... 360/130.21; 360/93
[58] Field of Search ........... 360/130.21, 130.2, 130.22, 360/130.23, 130.24, 90, 93, ; 226/196, 197; 242/197, 199

[56] References Cited

U.S. PATENT DOCUMENTS

| | | | |
|---|---|---|---|
| 3,756,610 | 9/1973 | Naegele et al. | 360/130.21 |
| 4,110,805 | 8/1978 | Oishi | 360/130.21 |
| 4,274,118 | 6/1981 | Mangold | 360/130.24 |
| 4,363,042 | 12/1982 | Kimura et al. | 360/130.21 |
| 4,459,627 | 7/1984 | Kitagawa et al. | 360/130.24 |
| 4,688,126 | 8/1987 | Ogawa | 360/130.24 |

FOREIGN PATENT DOCUMENTS

| | | | |
|---|---|---|---|
| 1124253 | 2/1960 | Fed. Rep. of Germany . | |
| 1772656 | 1/1978 | Fed. Rep. of Germany | 360/130.21 |
| 12159 | 1/1983 | Japan | 360/130.21 |
| 50650 | 3/1985 | Japan | 360/130.21 |
| 157758 | 8/1985 | Japan | 360/130.21 |

Primary Examiner—Stuart N. Hecker
Assistant Examiner—David J. Severin
Attorney, Agent, or Firm—Daniel Robbins

[57] ABSTRACT

In a magnetic tape transport where the tape is guided by means of conventional guides, the tape may wander at the surface of the magnetic transducer between limits set by the mechanical parameters of the guides, e.g. the distance between upper and lower flanges of the guides. The present invention teaches tilting the face of the transducer contacting the tape by an angle of 0.5° such that a component of force is generated which slides the tape along the transducer surface. The edge of the tape is then constrained to ride against a wear resistant shoulder mounted on the transducer surface, resulting in the tape being "locked" into position in relation to the magnetic transducer tracks.

5 Claims, 2 Drawing Sheets

APPARATUS AND METHOD FOR PRECISE TAPE GUIDING IN A MAGNETIC TAPE TRANSPORT

BACKGROUND OF THE INVENTION

1. Field of the Invention

This invention relates to tape guiding in a magnetic tape transport, and in particular to improved guiding providing precise control of tape position relative to the tracks of a magnetic transducer.

Figure 1:
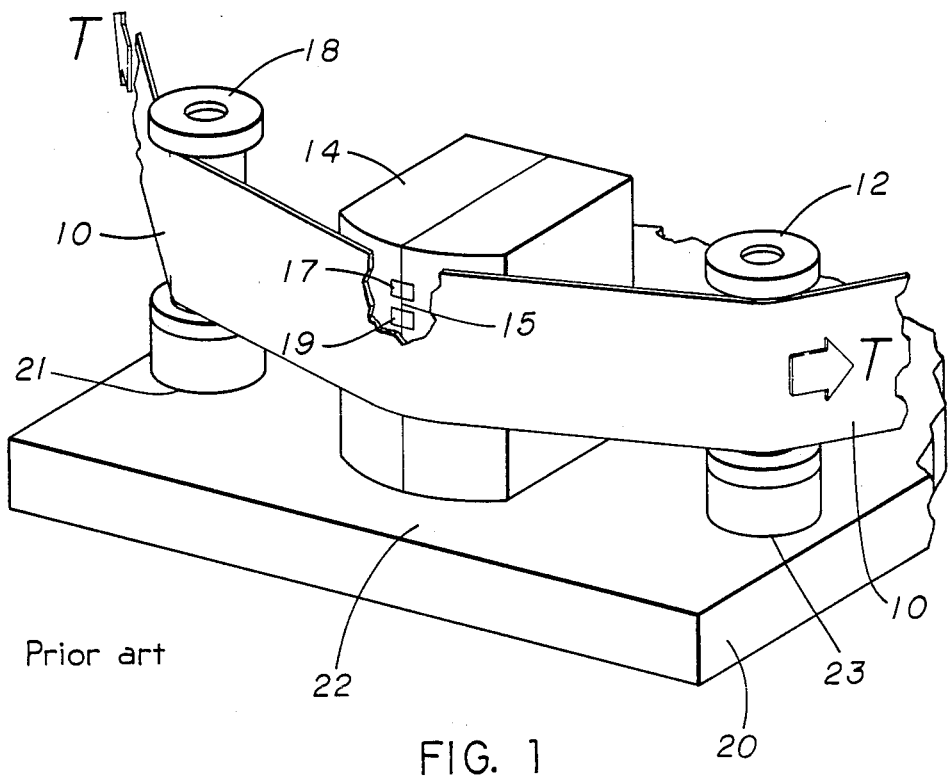
Figure 2:
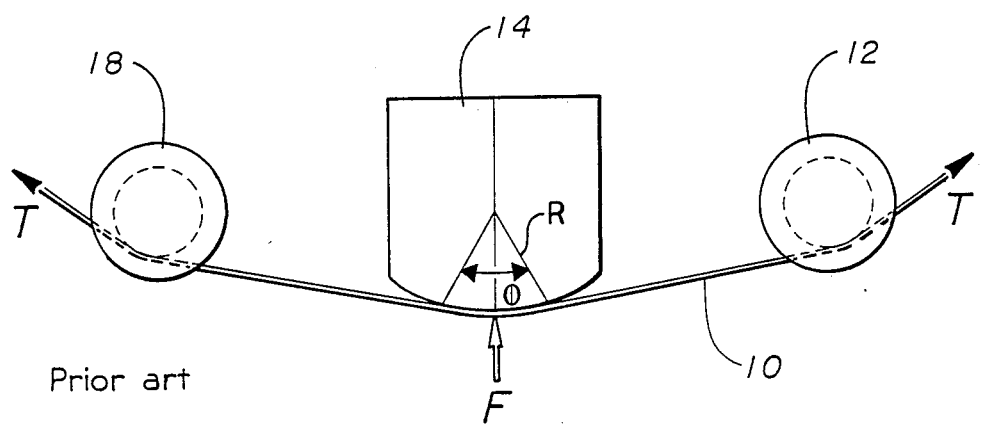
Figure 3:
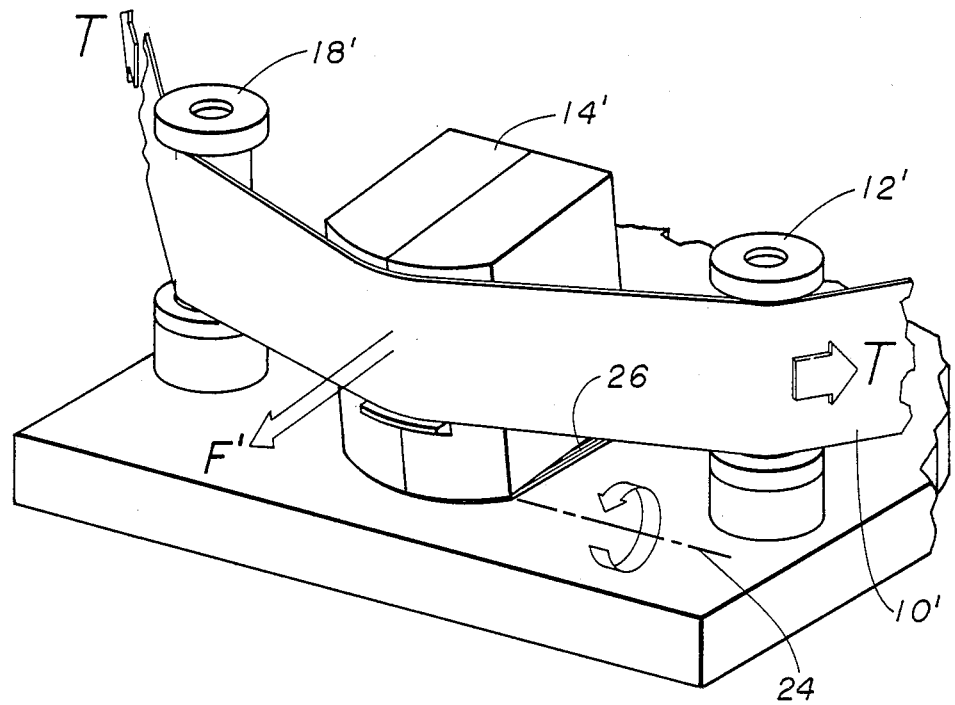
Figure 4:
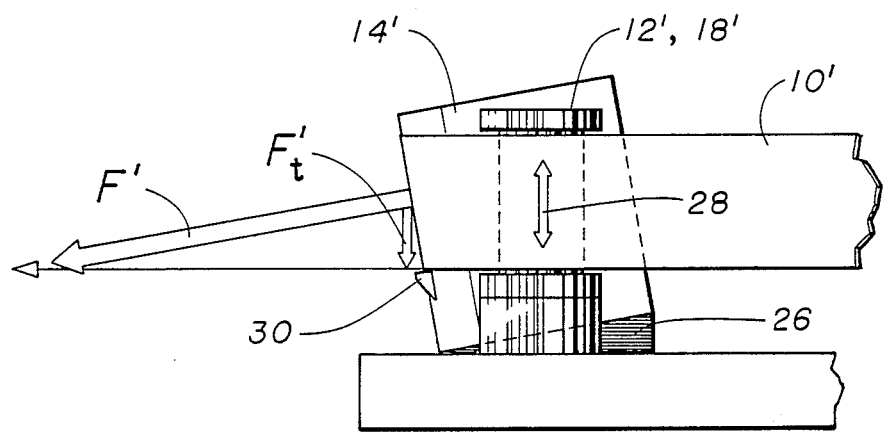

The invention, as well as the prior art, will be described with reference to the figures of which:

FIG. 1 is a perspective view of the elements comprising the tape path of a magnetic recorder known in the prior art, FIG. 2 is a plan view of the elements comprising the tape path illustrated in FIG. 1, FIG. 3 is a perspective view of elements comprising the tape path of a magnetic recorder according to the teaching of the invention, and FIG. 4 is a side elevation view of the elements of the tape path illustrated in FIG. 3.

2. Description Relative to the Prior Art

The guiding of the tape over a magnetic transducer of a magnetic tape transport is a critical design consideration in magnetic recorder design. In the prior art, many guide designs have been employed including fixed and rotating guides, cylindrical and crowned guides, and flanged and unflanged guides. Typically, the tape is unspooled from a supply reel, engages one or more guides for locating the tape relative to some reference plane, traverses a magnetic transducer located with respect to the reference plane whereby the tape is positioned with respect to the record/reproduce tracks of the transducer, leaves the transducer, re-engages one or more additional guides, and then spools onto a takeup reel. One purpose served by a guide is to change direction of the tape motion, and another important use is the precise positioning of the tape as it approaches, traverses and leaves the transducer. This positioning requirement is of utmost importance for tape tracking with multitrack magnetic heads, and the requirement becomes more stringent as the number of tracks increase and, attendantly, each track width dimension decreases.

Referring to FIG. 1, a typical configuration of a magnetic transducer and guides of the prior art illustrates a tape 10 in contact with fixed flanged guides 12, 18 and a multitrack transducer 14. The transducer 14 may be an erase head, a record head, a reproduce head, or a record/reproduce head. The cut away section of the tape 10 reveals the line of gaps 15 and tracks e.g. 17, 19 of the transducer 14. The tape 10, guided by the guide 12, and under tension T, approaches the transducer 14, and after leaving the transducer 14 engages the second guide 18. The guides 12, 18 are elements whose 21, 23 bases are accurately planar and whose axes are perpendicular to the bases. The distances between the upper and lower flanges of the guides 12, 18 are held to a dimension just over the maximum specified width of the tape 10. Similarly, the base of the transducer 14 is planar and the cylindrical tape contacting surface of the transducer 14 and its line of gaps 15, are perpendicular to the transducer base. (The phrase "line of gaps" is used generically, and includes the single track transducer case where it is equivalent to the phrase "gap line".) The guides 12, 18 and the transducer 14 are mounted on a plate 20 whose top surface 22 serves as a reference plane. The tape 10 is guided by being positioned between the upper and the lower flanges of the guides 12, 18. Because the guides 12, 18 and the transducers 14 are referenced to the same surface 22, the tape is resultantly positioned with respect to the tracks e.g. 17, 19 of the transducer 14. It will be noted that the prior art teaches that the axes of the guides 12, 18, and the line of gaps 15 of the transducer 14 are mutually parallel and perpendicular to the reference plane 22, and the plane of the magnetic tape 10 is attendantly perpendicular to the reference plane 22.

Referring to FIG. 2 which is a plan view of the tape, guide and transducer configuration of FIG. 1 the tape 10 is shown in contact with the cylindrical surface of the transducer 14 over an angle $\theta$, defined as the "tape wrap angle", and for a transducer having a radius R, the length of the arc of tape-head contact is equal to $R \times \theta$ when $\theta$ is expressed in radians. It will be seen that with the tape under a tension T, a force F normal to the transducer surface is applied by the tape to the transducer.

When guided as described above, the tape 10 may laterally wander in the direction of the axes of the guides within the constraints established by the upper and lower flange positions with resultant misregistration of the tape and the transducer tracks. Spring loading of one flange to urge the tape against a fixed second flange has been practiced with the goal of eliminating this lateral motion, but the resultant guides are mechanically complex and prone to edge damage the tape. Other guide geometries of varying complexity have also been advanced as solutions to the problem.

The present invention provides guiding of simplicity, reliability and precision which provides accurate registration of the tape and transducer tracks.

SUMMARY OF THE INVENTION

Recognizing that a force is exerted on the tape contacting surface of the transducer due to the tension in the tape, the practice of the invention teaches tilting the surface of the transducer so the reaction force by the transducer on the tape has a component urging the tape in the axial direction of the transducer. It is known experimentally that a flexible web under tension and in continuous circumferential motion across a fixed cylindrical element requires negligible force to move the web laterally along the direction of the axis of the fixed element. Consequently, under the influence of a minimal force component developed due to the tilt, the tape moves along the cylindrical surface of the transducer until the edge of the tape engages a shoulder of wear resistant material installed at the base of the transducer. The tape is resultantly firmly positioned relative to the tracks of the transducer right at the transducer. In this manner, practice of the invention teaches utilizing the transducer structure itself to guide the tape at a critical location in the tape path, unlike the teachings of the prior art where the positioning is effected by guides remote from the transducer with the attendant risks of tape wander and transducer misregistration.

DESCRIPTION OF THE INVENTION

FIG. 3 is an illustration showing the practice of the invention for a tape and transducer configuration corresponding to that of FIG. 1. A tape 10' is in contact with a transducer 14' whose tape contacting surface has been tilted in a direction towards the plane of the tape about an axis at the transducer base, the axis being tangent to the head surface and perpendicular to the line of gaps. (In the drawings, different but related elements are identified with the same reference character, albeit that such corresponding elements in the different drawings are distinguished by the use of primes.) An adequate angle of tilt 26 is 0.5 degrees. (The angle of tilt 26 is exaggerated in FIGS. 3 and 4 for clarity.) As previously described in connection with FIG. 2, the tape 10 exerts a force F normal to the transducer surface 14, and the transducer exerts an equal and opposite force F' on the tape as shown in FIG. 4. Considering the forces applied to the tape, it will be appreciated that the guides 12, 18 apply forces along the line of the arrow 28, parallel to the axis of the guides 12, 18. The force F' on the tape at the transducer surface has an unbalanced component Ft' along this same line due to the tilt. As previously stated, a web which is moving circumferentially across a fixed cylindrical surface may be readily slid axially by means of a small axial force. The tape, urged towards the base of the transducer by the component Ft' moves until the lower edge of the tape engages the shoulder 30 which is fabricated from a wear resistant material such as sapphire. The tape then rides firmly against the shoulder 30, and is maintained there by the component Ft'; the tape is "locked" in registration with the transducer tracks at the transducer itself. The shoulder 30 has a length in the direction of tape motion adequate to distribute the force Ft' over the tape edge contacting the shoulder without buckling or otherwise damaging the tape. For a head radius $R=0.125$, a wrap angle $\theta=5$ degrees, a tilt angle 0.5 degrees and a tape base thickness of 0.001", a shoulder length equal to the arc over which the tape contacts the surface of the transducer safely distributes the force Ft' on the tape edge without tape edge damage. For the above parameter values, the pressure exerted by the shoulder on the tape edge is approximately 13 psi which is negligible compared to the tensile strength of a typical material used for a magnetic tape base, such as polyester, which has a tensile strength of 20,000 psi.

The invention has been described in detail with particular reference to preferred embodiments thereof, but it will be understood that variations and modifications can be effected within the spirit and scope of the invention. For example, a preferred embodiment of the invention has been described with respect to tape guiding in a magnetic tape transport. It will be appreciated that the practice of the invention may readily be applied to other applications requiring the guiding of any flexible web being spooled from one reel to another. In such applications fixed guides in the web path may be tilted in the manner taught by the invention, thus providing edge guiding of the web against appropriate shoulders on the guides to eliminate axial wandering of the web.

What is claimed is:

1. An improved apparatus for transporting a magnetic tape wherein the plane of said magnetic tape is perpendicular to a reference plane having a magnetic transducer fixedly mounted thereon, said transducer further having a surface adapted for contacting said tape, said improved apparatus comprising:
    a. means for positioning said transducer to fix said surface at an angle substantially equal to 0.5 degrees with respect to a line perpendicular to said reference plane, whereby a force component urges said tape axially along said transducer surface, and
    b. tape support means integral with said transducer, whereby said tape is restrained from further axial movement along said transducer surface.

2. The apparatus of claim 1 wherein said support means is a shoulder located at said surface, adapted for contacting the edge of said magnetic tape.

3. The apparatus of claim 2 wherein said transducer is a multitrack transducer.

4. In a magnetic tape transport for transporting a magnetic tape while contacting the surface of a fixed magnetic transducer, said transducer being located on a reference plane, and wherein the plane of said magnetic tape is perpendicular to said reference plane, the improvement comprising the steps of:
    a. applying a force to said magnetic tape in contact with said magnetic transducer along the axial direction of said surface by fixedly mounting said transducer at a tilt angle whereby said surface deviates from perpendicularity with respect to said reference plane by an angle substantially equal to 0.5 degrees, and
    b. supporting the edge of said magnetic tape at said transducer, whereby the edge of said tape is located with respect to said surface of said transducer.

5. The tape guiding method of claim 4 wherein said edge supporting is effected by a shoulder at said transducer.

* * * * *